United States Patent
Von Essen et al.

(10) Patent No.: US 7,221,357 B2
(45) Date of Patent: May 22, 2007

(54) METHOD FOR SELECTING AND REPRESENTING OBJECTS IN A PLANE AND IN N-DIMENSIONAL SPACE

(75) Inventors: Hartwig Von Essen, Buxtehude (DE); Heiko Guenthner, Hamburg (DE); Manfred Endress, Buxtehude (DE); Holger Kuhlmann, Krummendeich (DE); Oliver Franzrahe, Hamburg (DE)

(73) Assignee: KID-Systeme GmbH, Buxtehude (DE)

( * ) Notice: Subject to any disclaimer, the term of this patent is extended or adjusted under 35 U.S.C. 154(b) by 391 days.

(21) Appl. No.: 10/372,002

(22) Filed: Feb. 21, 2003

(65) Prior Publication Data

US 2003/0156137 A1    Aug. 21, 2003

(30) Foreign Application Priority Data

Feb. 21, 2002    (DE) ................................ 102 07 185

(51) Int. Cl.
*G09G 5/00* (2006.01)
*G06F 3/00* (2006.01)

(52) U.S. Cl. ...................... 345/173; 345/179; 715/764; 715/767; 715/771; 715/810; 715/848; 715/854; 701/1; 701/28

(58) Field of Classification Search ........ 345/172–183; 178/18.01, 18.03, 18.04, 18.05, 18.06, 19.01, 178/19.02, 19.03, 19.04; 701/211, 1, 28, 701/33; 715/763, 764, 767, 771, 810, 816, 715/818, 848, 854, 967

See application file for complete search history.

(56) References Cited

U.S. PATENT DOCUMENTS

| | | | | |
|---|---|---|---|---|
| 5,539,429 | A | * | 7/1996 | Yano et al. ................. 345/173 |
| 5,632,009 | A | * | 5/1997 | Rao et al. ................... 715/509 |
| 5,956,020 | A | * | 9/1999 | D'Amico et al. ........... 345/173 |
| 6,040,824 | A | * | 3/2000 | Maekawa et al. .......... 345/173 |
| 6,177,927 | B1 | * | 1/2001 | Chery et al. ................ 345/173 |
| 6,243,086 | B1 | * | 6/2001 | Kawamukai et al. ....... 715/723 |
| 6,610,102 | B1 | * | 8/2003 | Aldred et al. ............... 715/509 |
| 6,781,610 | B2 | * | 8/2004 | Os et al. ..................... 715/764 |
| 6,909,407 | B1 | * | 6/2005 | Schradi et al. ................ 345/7 |
| 2002/0000977 | A1 | * | 1/2002 | Vranish ...................... 345/173 |
| 2002/0069221 | A1 | * | 6/2002 | Rao et al. ................... 707/509 |

OTHER PUBLICATIONS

Working with Icons, Cisco System Inc. Copyright 1898-1997 pp. 1-12.*

* cited by examiner

*Primary Examiner*—Lun-Yi Lao
(74) *Attorney, Agent, or Firm*—W. F. Fasse; W. G. Fasse

(57) ABSTRACT

Operating assemblies and installed components of a vehicle are represented by representational objects such as icons, graphic images and symbols on a touch-sensitive display screen. A matrix with matrix fields defined by the intersection of rows and columns is superimposed on the objects on the display screen. A rectangular region of the matrix is selected by touching two corner points, for example. All of the objects located in matrix fields that are entirely within, or at least partially within, or at least partially within or bordering on the selected rectangular region, are selected. Once the group of objects is selected, the entire group of the operating assemblies and installed components of the vehicle represented by the selected group of objects is operated or actuated simultaneously together as a group.

22 Claims, 8 Drawing Sheets

X: SELECTED MATRIX FIELD
☐: SELECTED RECTANGULAR REGION

☐: SELECTED RECTANGULAR REGION
▨: SELECTED OBJECT
▨: UNSELECTED OBJECT

ALLOCATION OF MATRIX COLUMNS TO PIXEL COLUMNS OF DISPLAY

X: SELECTED MATRIX FIELD
☐: SELECTED RECTANGULAR REGION

X: SELECTED MATRIX FIELD
☐ SELECTED RECTANGULAR REGION

FIG. 9

X: SELECTED MATRIX FIELD
□: SELECTED RECTANGULAR REGION

FIG. 10

X: SELECTED MATRIX FIELD
□: SELECTED RECTANGULAR REGION

☐ : SELECTED RECTANGULAR REGION

▨ : SELECTED OBJECT

▩ : UNSELECTED OBJECT

☐ : SELECTED RECTANGULAR REGION

▨ : SELECTED OBJECT

▦ : UNSELECTED OBJECT

☐ : SELECTED RECTANGULAR REGION

▨ : SELECTED OBJECT

METHOD FOR SELECTING AND REPRESENTING OBJECTS IN A PLANE AND IN N-DIMENSIONAL SPACE

PRIORITY CLAIM

This application is based on and claims the priority under 35 U.S.C. §119 of German Patent Application 102 07 185.3, filed on Feb. 12, 2002, the entire disclosure of which is incorporated herein by reference.

FIELD OF THE INVENTION

The invention relates to a method for representing and selecting objects in a plane and/or in N-dimensional space in any desired configuration or arrangement. The objects to be selected are especially icons or iconic representations of functional operating assemblies and installed components in a motor vehicle, so that desired ones or groups of the operating assemblies and installed components can be selected by selection of the corresponding icons.

BACKGROUND INFORMATION

In many different applications and fields of technology, it is known to represent functions, operating assemblies, or installed components of a machine or apparatus by respective corresponding representational objects such as symbols or icons on a display panel or the like, and to enable the selection, control, and operation of the respective associated functions, operating assemblies and installed components of the machine or apparatus through the user's selection of the respective corresponding icons or representational objects. For example, a user can simply touch the desired icons or representations on a touch-sensitive display screen, or use a computer mouse and its correlated mouse cursor on the display screen, or use a data glove, joystick or the like to make selections in a similar manner on such a display screen or even in a three-dimensional, e.g. holographic or stereoscopic, display.

As an example, it is commonly known to select and command the functions of a computer, and particularly the functions of the operating system or application software of a computer, by selecting the respective icons or images corresponding to the desired functions with a mouse cursor on the display screen, or with a finger touch on a touch-sensitive display screen. As another example, it is known to provide images of switches or the like on a touch-sensitive display screen, which thus provides a touch interface, whereby touching the image or icon representing the desired switch on the touch interface screen carries out an actuation of the selected switch.

The hardware and the software for embodying and carrying out such a system and method are known and available in the art. For example, the hardware involves touch-sensitive display screens, as well as display screens of any type that are not touch-sensitive but operate in cooperation with a mouse, joystick, track ball or the like, and the image of a selection cursor provided on the screen. The hardware further involves any conventionally known computer or other processing circuitry for generating the icons or images representing the respective functions, operating assemblies and installed components on the display screen or panel, and for evaluating the touch-input signals or cursor position and mouse-input signals, for example, so as to then provide a control command to actuate the respective selected function, operating assembly, or installed component.

Conventionally, the icons, graphic images, or symbols displayed on the screen or the like have a one-to-one correlation with respective associated functions, operating assemblies, or installed components that can be selected and actuated thereby. Also, a single selection by means of touching the touch-sensitive screen, or by correspondingly locating the mouse cursor on the screen and "clicking" the mouse, achieves only a single selection of a single function, operating assembly, or installed component, corresponding to the single icon, graphic representation or symbol that was selected. Thus, when it is desired to select or operate a number of functions, operating assemblies, or installed components at once, or essentially at once, it is generally necessary to carry out a succession of a corresponding number of individual point-and-touch or point-and-click selections. In other words, the conventional touch interfaces or point-and-click interfaces provide only a single selection and activation capability.

Within certain software applications, it is also known to select or "block" a variably sized group or set of items, data, or the like. For example, it is typically known in word processor applications to select a variably sized block of text by "clicking and dragging" or the like with a mouse, to then further manipulate the selected block of text. Similarly, in spreadsheet programs, it is known to select variably sized groups of cells of data in the columns and rows of a spreadsheet, in order to further manipulate the selected group of data cells. This ability of selecting a variably sized group of text or data items has, however, heretofore not been provided in connection with the selection of icons, graphical images, or symbols representing functions, operating assemblies, and installed components of a machine or apparatus that are to be selected and activated as a group. Especially in the context of a touch interface provided by a touch-sensitive screen or the like, it has not previously been provided, to select a group of a greater number of represented objects through a smaller number of touches.

SUMMARY OF THE INVENTION

In view of the above, it is an object of the invention to provide a method by which plural representational objects, such as icons, graphical images, or symbols, representing actual or real objects such as operating assemblies and installed components of a vehicle, can be selected and actuated with relatively few selections, i.e. a smaller number of selections than the number of objects to be selected. A more particular object of the invention is to provide such a method in connection with a touch interface, whereby the selections are carried out with a finger touch on a display screen or the like. It is a further object of the invention to display and represent the available functions, operating assemblies and installed components with representational objects such as icons, graphical images and symbols on a display screen or the like, whereby a rectangular grid or matrix is superimposed on these representational objects, and the configuration, arrangement, or organization of the objects in a plane or in N-dimensional space is automated so as to achieve an optimum representation and selection of a plurality of possible different configurations. It is further an object of the invention to achieve an ergonomic and efficient selection of a group of objects, while simultaneously providing an optimum automatic representation of the objects on a display, that is realistically or nearly realistically adapted to the real-world or physical arrangement of the operating assemblies or installed components that are represented thereby. The invention further aims to avoid or overcome the disadvantages of the prior art and to achieve additional advantages, as apparent from the present specification.

The above objects have been achieved according to the invention in a method for representing and selecting objects in a plane or in N-dimensional space in any desired configuration or arrangement, particularly wherein the objects respectively represent operational assemblies and installed components of a vehicle, which are selected and actuated by the selection of the corresponding representational objects. Particularly according to the invention, for the electronically supported representation and selection of the objects, a matrix with m rows and n columns is superimposed on the representational objects, whereby the corresponding objects are positioned in or on the fields of the matrix in an arrangement that represents or corresponds to the real arrangement of the represented operating assemblies and installed components in the real vehicle. For the representation and selection of each respective object, one or more fields of the matrix may be entirely or partially utilized.

For example, the operating assemblies and installed components of the vehicle may comprise a thermostat, a blower, a control valve, a controllable vent, an air conditioning pack or plant, a heater, and other associated components making up an air conditioning system of an aircraft. As another example, the operating assemblies and installed components of the vehicle may include general cabin illumination lights, passenger reading lights, emergency illumination lights, signage illumination lights, switches, dimmers, and other associated components of a lighting system of an aircraft. A further example of the operating assemblies and installed components of the vehicle comprises a fire extinguishing agent supply arrangement, distribution conduits, control valves, discharge nozzles, fire sensors, and associated components making up a fire detection, suppression and extinguishing system in an aircraft. Yet another example of the operating assemblies and installed components of the vehicle may comprise navigational aids, engine operation sensors, fuel sensors, speed sensors, control sensors, control actuators, associated displays, and all other avionics installed in the cockpit for monitoring and controlling components and systems of the aircraft, and for navigating and flying the aircraft. In general, the operating assemblies and installed components of a vehicle within the scope of the invention include all assemblies, components and systems of a vehicle that carry out any function associated with the operation, navigation, maintenance, or servicing of the vehicle, for example.

According to further particular details of the invention, the height of the rows and the width of the columns of the matrix can have any desired dimension, and the matrix may include columns having respective different widths and/or rows having respective different heights. The rows and columns are preferably numbered or otherwise labeled so that an automatic electronic, e.g. computer-based, processing thereof is possible. The intersection of a respective column and of a respective row defines a matrix field, whereby the proportion of the matrix field surface or matrix field surfaces used for representing the object or objects can be variable as desired between 0 and 100%. Moreover, when an object is represented in one or more matrix fields that are only partially utilized for the representation, the positioning of the object within the matrix field or fields is unrestricted, i.e. can be as desired.

It is especially advantageous according to the invention, that a plurality of objects can be selected block-wise as a group by carrying out a number of selections less than the number of objects in the group. Particularly, a group of any size, i.e. any number of objects, can be selected with only two selections or with a number of selections less than the number of objects. For example, a group of objects can be selected simply by selecting two diagonally opposite corner points of a rectangular region of the matrix. The two diagonally opposite matrix fields can be selected so as to mark the corners of the rectangular region that is being selected as a group. In this context, the selected matrix fields lying at diagonally opposite corners of the rectangular region can be located directly within, or just outside of and adjacent to, the rectangular region that is selected by the selection of these corner matrix fields.

Further in this regard, there are several variants of the objects that will be selected in connection with a selection of a defined rectangular region of the matrix. In a first variant, all objects that lie completely within the rectangular region of the matrix will be selected. According to a second variant, all objects that lie completely or at least partially within the rectangular region of the matrix will be selected. According to a third variant, all objects that lie completely or at least partially within the rectangular region and all objects that lie outside of, but border directly on, the rectangular region will be selected as a group.

Another way of considering the selection of the rectangular region is with respect to the selection of matrix fields. For example, in a first variant, all matrix fields that are completely or partially used for the representation of a given object, and which lie completely within the rectangular region, will be selected. According to a second variant, all matrix fields that are used partially or completely for the representation of a given object, and which lie completely or at least partially within the rectangular region, will be selected. According to a third variant, all matrix fields that are used completely or partially for the representation of an object, and which lie completely or at least partially in the rectangular region or that border directly on, but lie outside of, the rectangular region, will be selected.

The selection is not limited to a rectangular region being selected by two selections. Instead, a single row or a single column (i.e. forming a small or narrow rectangular region) can be selected by two selections, while a triangular region can be selected with three selections, a square or rectangular region could be selected with four selections at the corners thereof, and any desired polygon region with N1 corners or sides can be selected with N1 selections. Furthermore, the selection of a group of objects is not limited to a single rectangular or polygon region forming the group. To the contrary, the selection of s objects making up the selected group can be chained together by successive selections of groups or regions and/or individual objects, in order to group or collect together several different groups or regions as well as additional individual objects that are to be collected, to form thereof a sum selection or cumulative group.

According to a further feature of the invention, various different arrangements or configurations of objects are automatically displayed or represented, in that a respective allocation of the representational objects to the matrix fields of the superimposed matrix is provided for each available or real configuration of the respective associated operating assemblies or installed components of the vehicle. The respective corresponding arrangements or configurations of the objects on the matrix fields are automatically displayed or represented on the user interface surface, such as the touch-sensitive display screen, through automatic electronic evaluation, e.g. by means of a computer. The different configurations can then be selected, e.g. by touch input on the screen as discussed above. Once a desired group and configuration of the objects is selected, further selections will actuate or operate the desired functions of the actual operating assemblies or installed components of the vehicle corresponding to the selected representational objects of the given selected group.

The inventive method can be carried out with respect to a two-dimensional planar representation of the objects, or alternatively in an n-dimensional spatial representation of the objects, for example using a data glove to make selections in a three-dimensional, e.g. holographic or stereoscopic, displayed representation of the objects respectively representing the associated operating assemblies and installed components of the vehicle in three-dimensional real space.

BRIEF DESCRIPTION OF THE DRAWINGS

In order that the invention may be clearly understood, it will now be described in connection with example embodiments thereof, with reference to the accompanying drawings, wherein:

FIG. 9 is a schematic illustration similar to that of FIG. 7, showing a third alternative for selecting a rectangular region of matrix fields;

FIG. 10 is a schematic illustration similar to that of FIG. 7, showing a fourth alternative for selecting a rectangular region of matrix fields;

DETAILED DESCRIPTION OF PREFERRED EXAMPLE EMBODIMENTS AND OF THE BEST MODE OF THE INVENTION

As generally described above, according to the invention, real physical objects, such as the operating assemblies and installed components of a vehicle, are represented on a display screen or the like by representational objects, such as icons, graphic images or symbols, so that individual ones or groups of the objects can be selected and then actuated or operated by means of corresponding selection inputs, such as by means of a user's finger touch on a touch-sensitive display screen. To simplify and facilitate the representation and selection of the objects on the display screen or the like, the invention provides a matrix of m rows and n columns superimposed on the representational objects, or vice versa, the objects are superimposed on the matrix. Both of these variants are considered to be the same thing under the definition of the matrix being superimposed on the objects.

The representational objects may be simple rectangular blocks, which may optionally be labeled with a text identifier, for example. Alternatively, the representational objects may be graphic images presenting a simplified, yet recognizable visual image of the real object (e.g. operating assembly or installed component of the vehicle) being represented. As a further alternative, the representational objects may be icons that do not realistically represent the visual appearance of the real object being represented, but present an image that provides a logical or cognitive relationship or link to the real object being represented, in the perception of the user. As another alternative, the representational objects may be symbols or text or the like, which identify the real object being represented to the user. These various alternatives may be used respectively exclusively, or in combination with one another, for representing the totality of the real objects to be represented.

Figure 1:
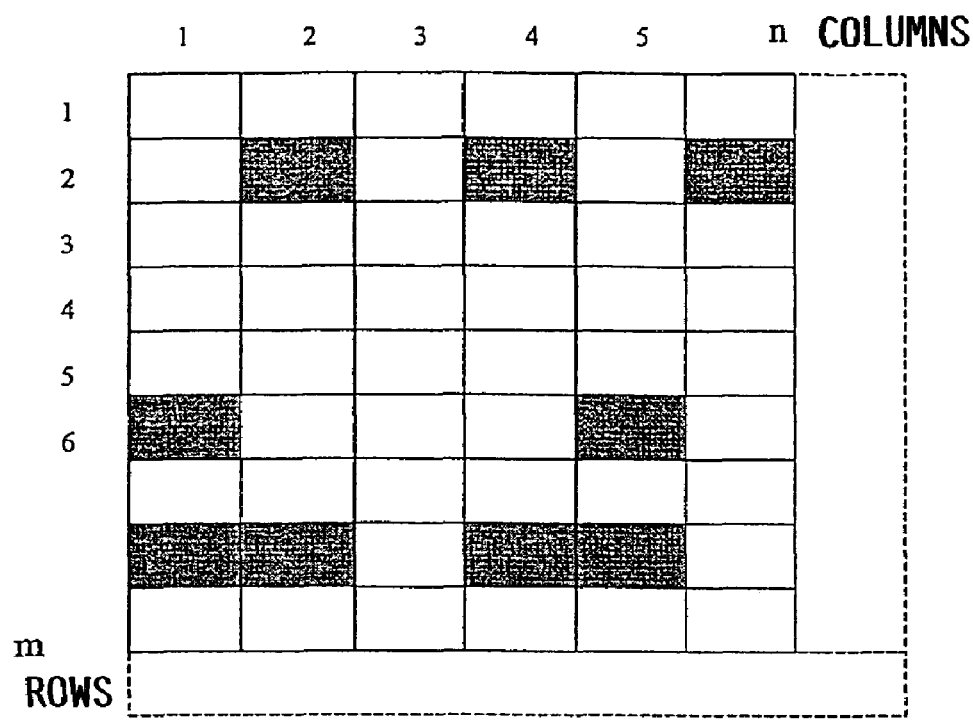
FIG. 1 is a schematic illustration of a matrix of m rows and n columns for representing objects, whereby individual matrix fields or cells are completely used for the representation of respective individual objects.

Since the matrix merely provides a grid for simplifying and automating the positioning, configuration, grouping and selection of the representational objects, the particular shape and size of the individual representational objects is not limited by the particular shape and size of the individual matrix fields or cells formed respectively by the intersection of the rows and columns of the matrix. As a simplest example, however, as shown in FIG. 1, each individual object is represented through the complete or full utilization of a respective individual corresponding matrix field of the matrix. In other words, each representational object completely fills a single matrix field to which it is allocated, without spanning into more than one matrix field, and without leaving any field area of the respective matrix field unoccupied.

Figure 2:
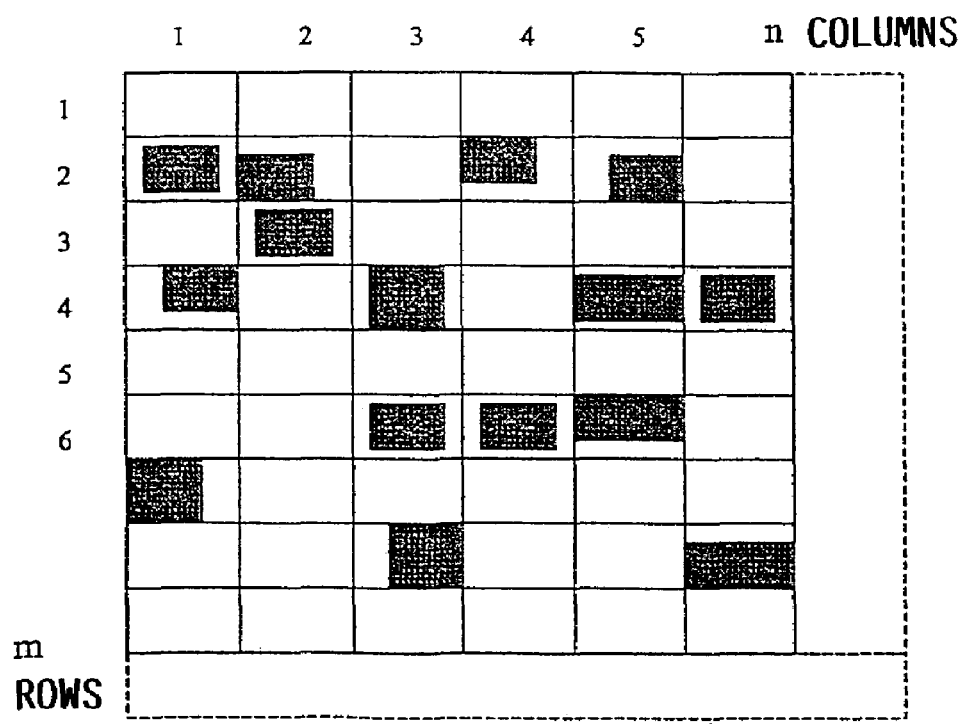
FIG. 2 is a schematic illustration similar to that of FIG. 1, whereby individual matrix fields are only partially used for the representation of respective individual objects.

Alternatively as shown in FIG. 2, each individual one of the representational objects occupies only a portion of a corresponding respective one of the matrix fields. In other words, each respective representational object is confined to a single matrix field without spanning into more than one matrix field, and the respective representational object does not occupy the entire field area of the given matrix field. The size and the position of the representational object within the given matrix field is unrestricted. The given representational object can occupy from 0% to 100% of the given associated matrix field, whereby the object may span only a portion or the entirety of the column width, and may span only a portion or the entirety of the row height of the given matrix field or cell. Also, the representational object occupying less than 100% of the field area of the matrix field can be located as desired within the matrix field, e.g. all the way to the left, all the way to the right, centered in the lateral direction, or uncentered in the lateral direction, as well as all the way to the top, all the way to the bottom, centered in the height direction, or uncentered in the height direction.

The significant aspect is simply that the representational objects are allocated to given matrix fields of the superimposed matrix, so that the objects can be grouped and selected in connection with a selected region of the matrix as will be described below.

Figure 3:
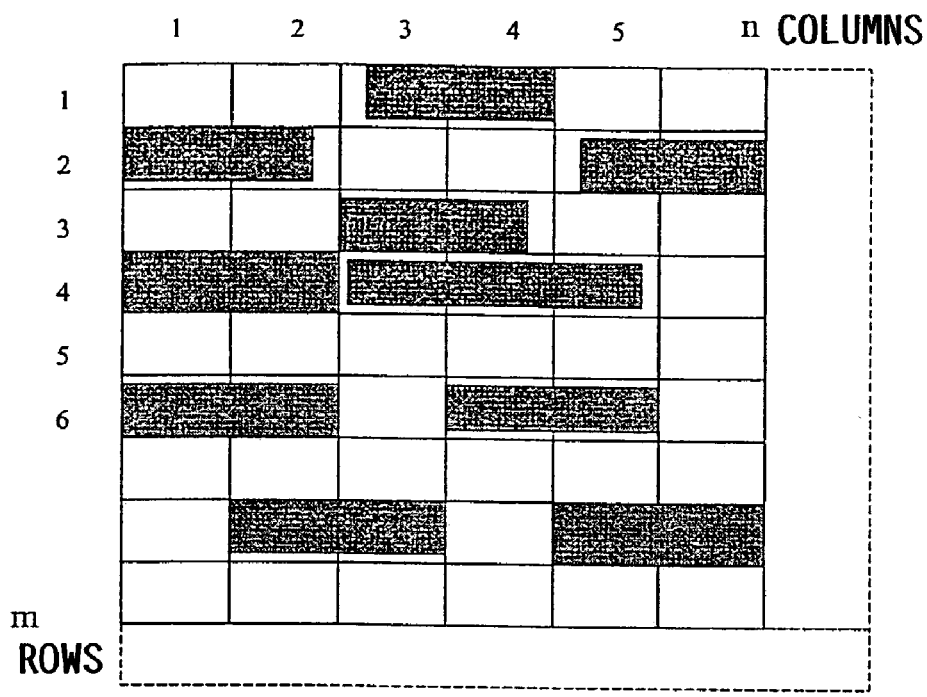
FIG. 3 is a schematic illustration generally similar to that of FIG. 1, whereby plural matrix fields within a given matrix row are either completely or only partially used for representing each respective individual object.

FIG. 3 shows a further alternative, in which plural matrix fields within a given row of the matrix are used for the representation of individual objects, whereby a given individual object may occupy the complete area or only a partial area of the plural matrix fields used for its representation.

Figure 4:
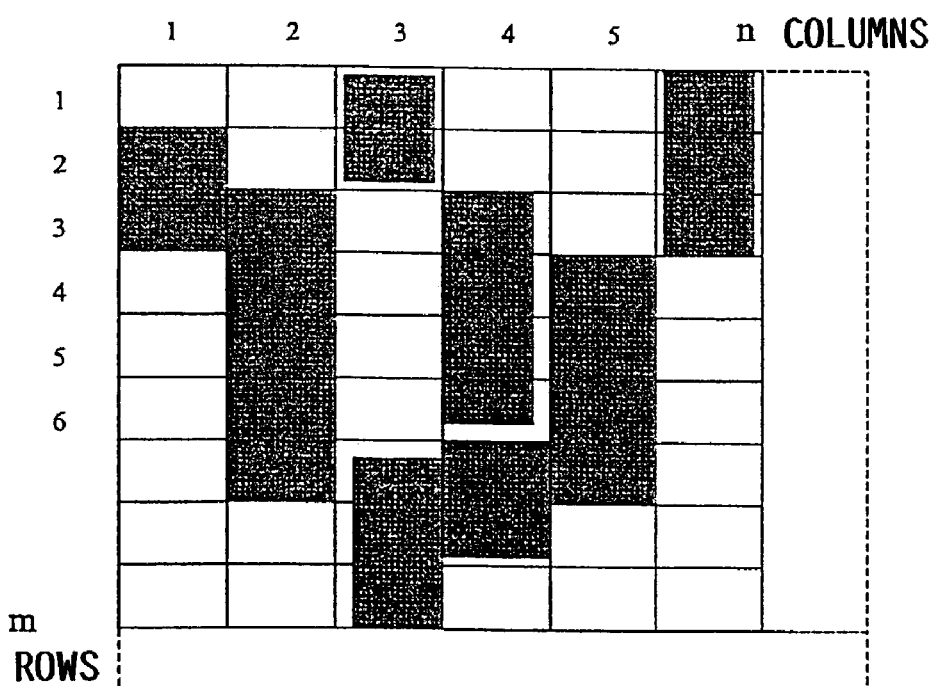
FIG. 4 is a schematic illustration generally similar to that of FIG. 1, whereby plural matrix fields within a given matrix column are either completely or only partially used for representing each respective individual object.

FIG. 4 shows a further alternative generally similar to FIG. 3, but with plural matrix fields of a given column (rather than a given row as in FIG. 3) being used for the representation of each respective individual object.

Figure 5:
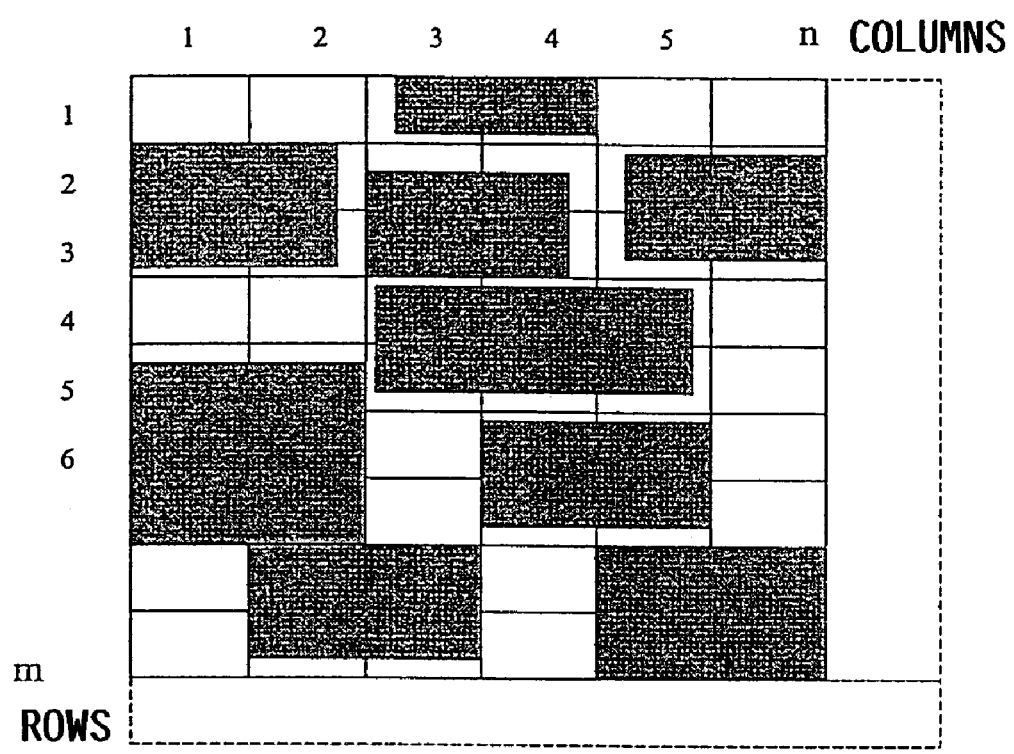
FIG. 5 is a schematic illustration generally similar to that of FIG. 1, whereby plural matrix fields that respectively span plural rows and plural columns are used either completely or only partially for representing each respective individual object.

FIG. 5 shows a further alternative similar to FIGS. 3 and 4, but using plural matrix fields that span plural rows and plural columns for the representation of each respective individual object. As in the above embodiments, the size of each object is unrestricted in terms of the number of matrix fields used to represent the object, and the proportion of the area of the allocated matrix fields actually occupied by the respective individual object is also freely variable.

Figure 6:
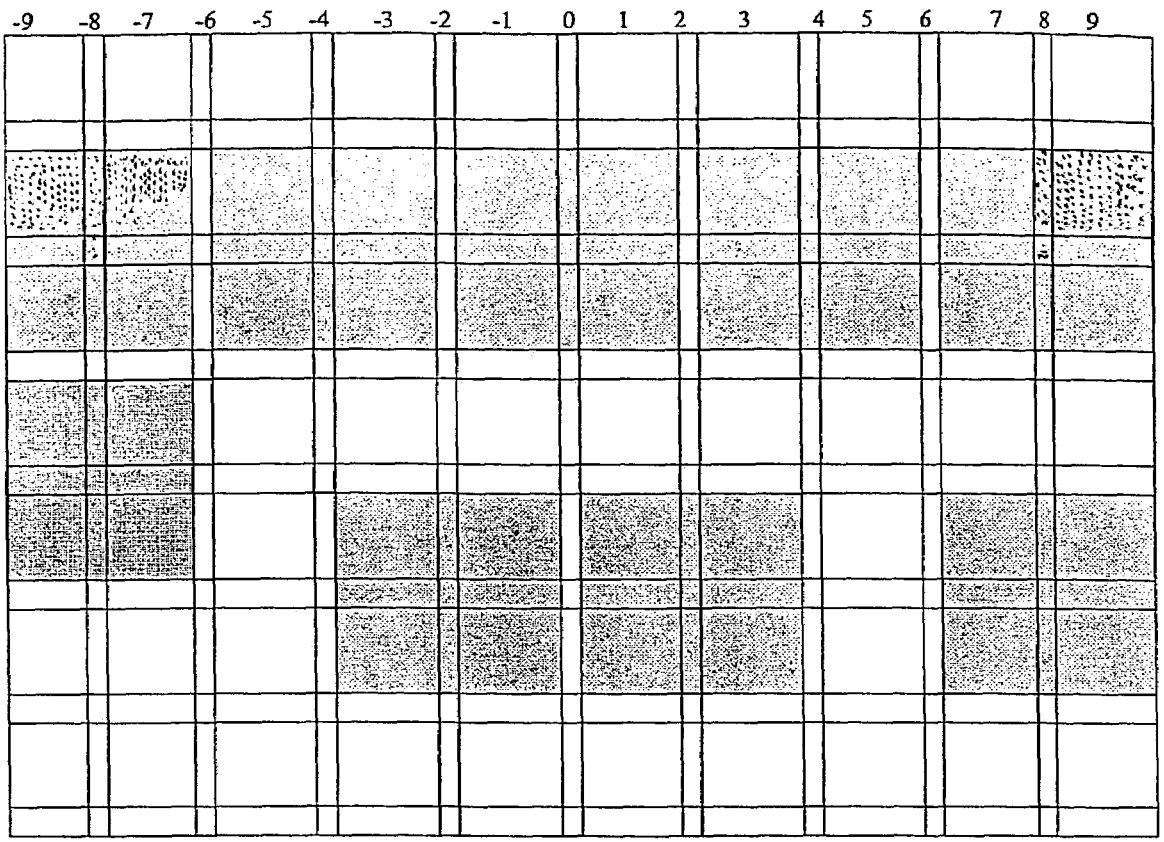
FIG. 6 is a schematic illustration of an alternative embodiment of a matrix with various different column widths and various different row heights, and with a different system of numbering the columns, as well as an allocation of the columns to pixels of a display.

The widths of the columns and the heights of the rows of the matrix are variable or selectable as desired without restriction. For example, the columns may be wider than the rows are high, as shown in the above FIGS. 1 to 5. Alternatively, the columns may be narrower than the rows are high. It is also possible to provide columns of differing width and/or rows of differing height within the same matrix, as schematically shown in FIG. 6. Particularly, FIG. 6 shows a matrix with wide columns and narrow columns, and with tall rows and short rows. FIG. 6 also shows the allocation of the matrix columns to the pixel columns of a display, whereby each of the wide matrix columns occupies six pixel columns of the display, and each of the narrow matrix columns occupies only one pixel column of the display. In such a matrix with various-sized columns and rows, it is similarly possible, as described above in connection with FIGS. 1 to 5, to provide objects that have various different sizes, e.g. spanning various numbers of rows and columns.

FIG. 6 also demonstrates that various different labeling or numbering systems can be used for identifying the rows and columns. In FIGS. 1 to 5, the rows and columns have each been identified with successive numbers 1, 2, 3, 4, 5, 6, beginning from the upper left corner of the matrix. As an alternative, FIG. 6 shows the columns numbered with successive numbers –9 to 9, whereby the center column is labeled 0, with negative column numbers progressing toward the left and positive column numbers progressing toward the right. Any labeling, numbering or referencing system may be used to identify the rows and columns, in such a manner to enable an automatic, e.g. electronic or computer based, representation and selection of the objects, as well as the configuration and grouping of the objects on the display screen or the like in connection with the superimposed matrix.

Various different embodiments are possible for the block-wise or group-wise selection of a plurality of the objects with n1 objects representing n1 operating assemblies or installed components of the vehicle, whereby n1>1. In this manner, with the selection of an entire group of objects rather than only individual objects according to the invention, it is only necessary to make from 2 up to n2 selections (where n2<n1), rather than n1 selections, which would be the case if respective objects are each selected individually. For example, there are several embodiments by which only two selections are needed for selecting a group of any number of objects. This is achieved by selecting a desired rectangular region of matrix fields, and thereby selecting the objects associated with those matrix fields, as will be described next in connection with particular embodiments and examples.

Figure 7:
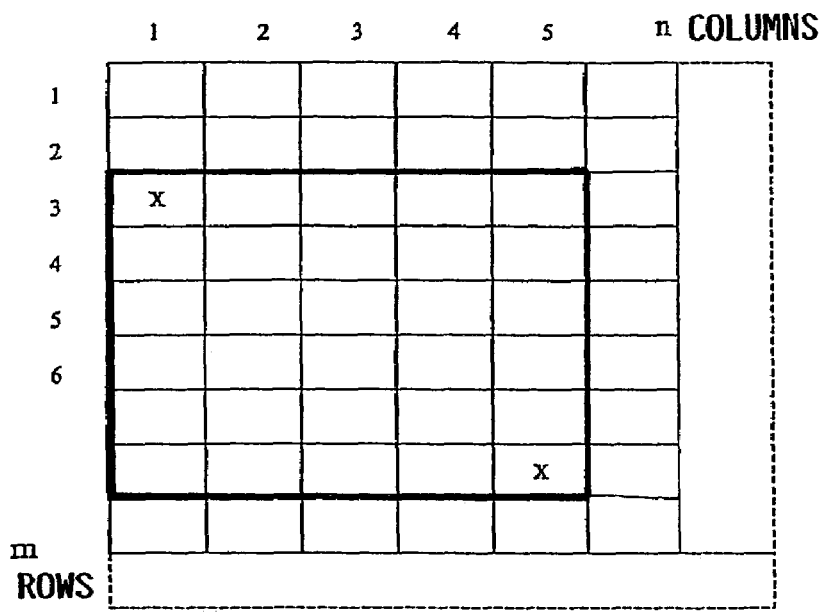
FIG. 7 is a schematic illustration of a matrix with m rows and n columns, showing a first alternative for selecting a rectangular region of matrix fields.

FIG. 7 shows an example, whereby selecting, e.g. touching, the respective matrix fields at the upper left and lower right corners of a rectangular region acts as a selection of this rectangular region enclosing these two corner fields. In FIG. 7, the two selected corner fields are referenced with an X, and the selected rectangular region is illustrated as a box with a thicker line outlining the region.

Figure 8:
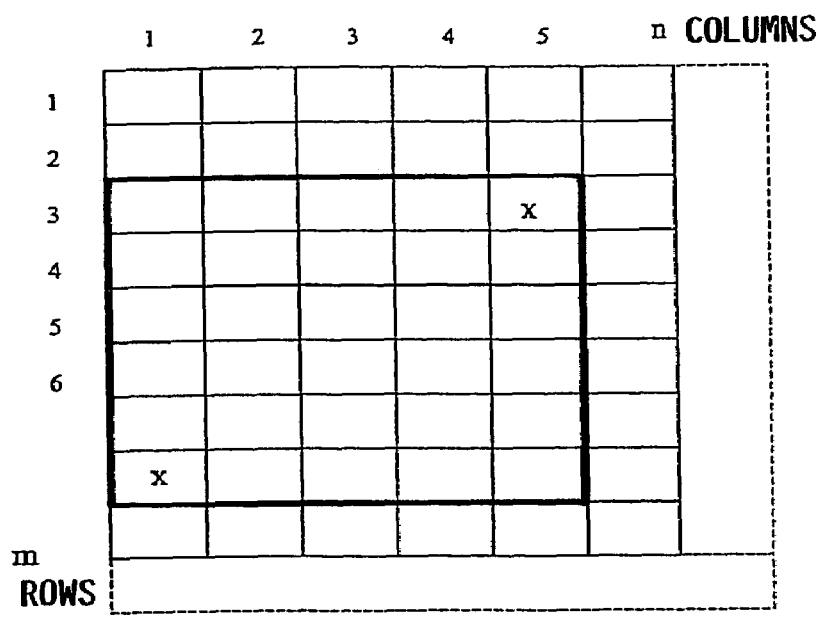
FIG. 8 is a schematic illustration similar to that of FIG. 7, showing a second alternative for selecting a rectangular region of matrix fields.

FIG. 8 generally corresponds to FIG. 7, but shows the selection of the upper right and lower left matrix fields of a rectangular region acting as a selection of that rectangular region. FIGS. 9 and 10 are generally similar to FIGS. 7 and 8, but in FIGS. 9 and 10, the selection of two matrix fields defines two respective diagonally opposite corners of a rectangular region lying inwardly between the two selected fields, rather than enclosing and including the two selected fields as in FIGS. 7 and 8. In other words, in FIGS. 9 and 10, the selected fields lie just outside of the selected rectangular region, while in FIGS. 7 and 8 the selected fields lie just inside of the selected rectangular region.

Figure 11:
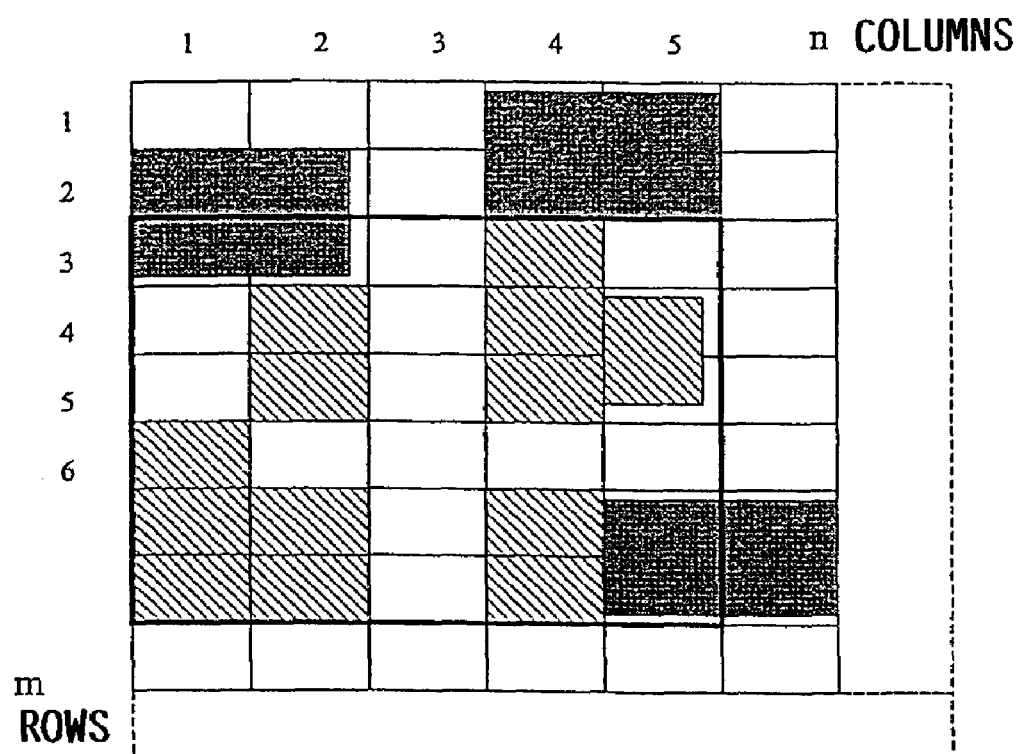
FIG. 11 is a schematic illustration of a matrix with a selected rectangular region of matrix fields, with a selection of all objects that fall entirely within the selected rectangular region according to a first variant.
Figure 12:
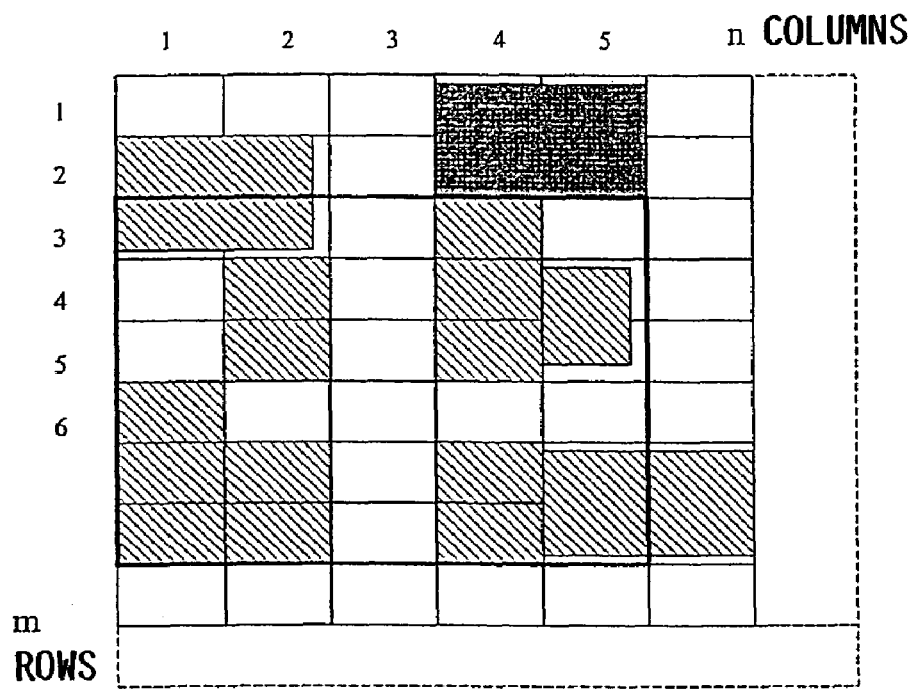
FIG. 12 is a schematic illustration similar to that of FIG. 11, showing the selection of all objects that fall either completely or at least partially within the selected rectangular region according to a second variant.
Figure 13:
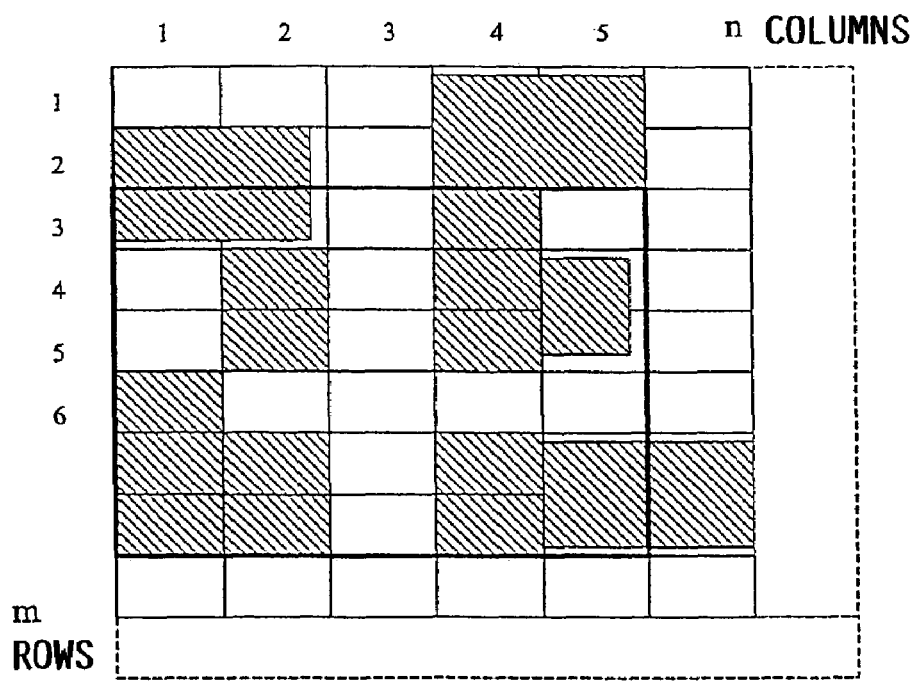
FIG. 13 is a schematic illustration similar to that of FIG. 11, showing the selection of all objects that fall either entirely or at least partially within, or border directly on, the selected rectangular region according to a third variant.

Once the rectangular region of matrix fields has been selected, there must be a corresponding selection or allocation of the objects that are selected in connection with this selected rectangular region. There are several alternatives for achieving this, since there is not necessarily a direct one-to-one correspondence between objects and matrix fields as described above. FIGS. 11 to 13 show three alternatives.

A first variant is shown in FIG. 11, whereby all objects that lie completely within the selected rectangular region of matrix fields will be selected. On the other hand, any objects that fall completely or partially outside of the selected rectangular region will not be selected. In FIGS. 11 to 13, the diagonally cross-hatched areas represent selected objects, while the dark gray areas represent non-selected objects.

FIG. 12 represents a second variant, wherein all objects that lie completely or at least partially within the selected rectangular region will be selected. Only the objects that lie completely outside of the selected rectangular region will not be selected.

In a third variant as shown in FIG. 13, all objects that lie completely or at least partially in the selected rectangular region, or that at least border on the outside of the selected rectangular region will be selected. Only objects that are completely outside of and not bordering on the selected rectangular region will not be selected.

Further variants exist, and can be understood without requiring further additional figures. For example, these variants relate to the fields that are selected in connection with the selected rectangular region. In a fourth variant, all matrix fields that are completely or partially used by the representation of an object and that lie completely in the selected rectangular region, will be selected. According to a fifth variant, all matrix fields that are completely or at least partially used by the representation of an object and that lie completely or partially in the selected rectangular region, will be selected. According to a sixth variant, all matrix fields that are completely or partially used by the representation of an object, and that lie completely or partially in the selected rectangular region or that border directly on the outside of the selected rectangular region, will be selected.

The inventive method further provides for the chaining or cumulative selection of plural successive groups and/or individual objects. Namely, after a first group of objects has been selected as described above, another group of objects can be selected in the same manner, or a single object can be selected by simply "touching" the object or any matrix field at least partially occupied by the object. These successive selections of groups of objects and/or individual objects can be chained or summed together to form a collective master group or super group of objects that are all to be selected, operated, and/or actuated together. This especially comes into play when the desired grouping of objects that is to be selected is not available as a contiguous grouping of objects covered by a selected rectangular region as described above.

It should further be understood that the selection of a particular range of matrix cells or fields in a given row or column is simply a special case of selecting a rectangular region. Such a range of fields in a row or column can be selected by simply selecting the fields at the two opposite ends of the linear range. Alternatively, three selections can be used to define the corners of a selected triangular region, and N selections can be used to define the corners of a selected region having the shape of an N-gon, i.e. a polygon with N-corners and N-sides. As a further example, a square or rectangular region can be selected by selecting the fields at the four corners thereof, as a special case of the above-mentioned N-gon, instead of by selecting two diagonally opposite corners thereof as discussed in detail above. Each selection can, for example, involve a finger touch by the user on the respective location of the selected matrix field being displayed on the touch-sensitive display screen.

While the inventive method has been described with reference to the representation and selection of objects in a two-dimensional plane in connection with a two-dimensional matrix, this method also applies similarly in connection with the representation and selection of objects in an N-dimensional space, for example in a holographic or stereoscopic representation of objects within a three-dimensional space.

Various different arrangements or configuration of the objects can be automatically displayed, in that the various different configurations are stored in a computer memory. Each configuration corresponds to a respective allocation of objects to particular matrix fields. The desired configurations can be automatically evaluated, e.g. by computer, and then displayed and represented on the user interface panel, such as a touch-sensitive display screen, whereupon the objects can be selected in the manner described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for representing and selecting installed components and operating assemblies of a vehicle, comprising:
   a) displaying representational objects respectively representing said installed components and operating assemblies;
   b) superimposing on said displayed representational objects a matrix of m rows and n columns defining respective matrix fields at intersections of said rows and columns, wherein each respective one of said representational objects completely or partially occupies one or more of said matrix fields; and
   c) selecting one or more selected ones of said installed components and operating assemblies by selecting one or more of said matrix fields that are completely or partially occupied by one or more of said representational objects respectively representing said one or more selected ones of said installed components and operating assemblies, comprising selecting a first group of said representational objects by twice carrying out the same selection operation to thereby respectively select two of said matrix fields that define two diagonally opposite corners of a rectangular region of said matrix, whereby said rectangular region is thereby selected.

2. The method according to claim 1, wherein said two matrix fields lie within said rectangular region at said two diagonally opposite corners thereof.

3. The method according to claim 1, wherein said two matrix fields lie outside of said rectangular region directly adjacent to said two diagonally opposite corners thereof, with said rectangular region defined directly between said two matrix fields.

4. The method according to claim 1, wherein said step c) comprises automatically selecting as a group all of said representational objects that lie completely within said rectangular region.

5. The method according to claim 1, wherein said step c) comprises automatically selecting as a group all of said representational objects that lie completely or at least partially within said rectangular region.

6. The method according to claim 1, wherein said step c) comprises automatically selecting as a group all of said representational objects that lie completely or at least partially within said rectangular region and all of said representational objects that lie outside of and directly border on said rectangular region.

7. The method according to claim 1, wherein said step c) further comprises automatically selecting all of said matrix fields that are respectively completely or partially occupied by one of said representational objects of said group and that lie completely within said rectangular region.

8. The method according to claim 1, wherein said step c) further comprises automatically selecting all of said matrix fields that are respectively completely or partially occupied by one of said representational objects of said group and that lie completely or at least partially within said rectangular region.

9. The method according to claim 1, wherein said step c) further comprises automatically selecting all of said matrix fields that are respectively completely or partially occupied by one of said representational objects of said group and that lie completely or at least partially within or that lie outside of and directly border on said rectangular region.

10. The method according to claim 1, wherein said step c) further comprises selecting another group of a plurality of said representational objects and/or selecting a single one of said representational objects after said selecting of said first group, and accumulating said first group together with said another group and/or said single one as a collective group of said representational objects.

11. The method according to claim 1, wherein said displaying of said representational objects in said step a) comprises displaying different available configurations of said representational objects relative to each other and relative to said matrix, and said step c) further comprises selecting one of said displayed available configurations.

12. The method according to claim 1, wherein said displaying of said representational objects and said superimposing of said matrix is carried out in a two-dimensional plane.

13. The method according to claim 1, wherein said displaying of said representational objects and said superimposing of said matrix is carried out in N-dimensional space where N is at least 3.

14. The method according to claim 1, wherein said displaying and said selecting are carried out on a touch-sensitive user interface display screen.

15. The method according to claim 14, wherein each said selection operation comprises touching said touch-sensitive user interface display screen respectively at a respective one of said opposite corners.

16. The method according to claim 1, wherein, in said step a), said representational objects are positioned relative to each other in a representational configuration representing an actual arrangement of said installed components and operating assemblies relative to each other.

17. The method according to claim 1, further comprising, after said step c), actuating or controlling said one or more selected ones of said installed components and operating assemblies.

18. The method according to claim 1, wherein said matrix includes ones of said rows respectively having different heights and/or ones of said columns respectively having different widths.

19. The method according to claim 1, wherein said rows and said columns are each referenced with an identifier label so as to enable an automated electronic processing of said rows and columns.

20. The method according to claim 1, wherein at least some of said representational objects respectively only partially occupy greater than 0% and less than 100% of an area of one or more of said matrix fields.

21. The method according to claim 20, wherein different ones of said representational objects are positioned differently respectively in said one or more of said matrix fields.

22. The method according to claim 1, wherein at least some of said representational objects respectively completely occupy 100% of an area of one or more of said matrix fields.

* * * * *